US009587588B2

(12) United States Patent
Wade

(10) Patent No.: US 9,587,588 B2
(45) Date of Patent: Mar. 7, 2017

(54) DIRECT INLET AXIAL AUTOMOTIVE TURBINE

(71) Applicant: Ford Global Technologies, LLC, Dearborn, MI (US)

(72) Inventor: Robert Andrew Wade, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 13/935,255

(22) Filed: Jul. 3, 2013

(65) Prior Publication Data
US 2015/0007563 A1 Jan. 8, 2015

(51) Int. Cl.
*F02B 37/18* (2006.01)
*F02F 1/24* (2006.01)
*F01N 13/10* (2010.01)
*F02C 6/12* (2006.01)
*F02F 1/42* (2006.01)
*F02M 25/07* (2006.01)

(52) U.S. Cl.
CPC ............ *F02M 25/07* (2013.01); *F01N 13/10* (2013.01); *F02B 37/18* (2013.01); *F02C 6/12* (2013.01); *F02F 1/243* (2013.01); *F02F 2001/4278* (2013.01); *F05D 2220/40* (2013.01); *Y02T 10/144* (2013.01)

(58) Field of Classification Search
CPC F02B 37/00; F02B 39/00; F02B 37/18; F02F 1/18; F02F 1/24; F02F 1/36
USPC .................................................... 60/602, 323
See application file for complete search history.

(56) References Cited

U.S. PATENT DOCUMENTS

| 2,781,057 A | * | 2/1957 | Fletcher | F01D 25/30 60/697 |
| 3,120,374 A | * | 2/1964 | Herzog | F01D 25/30 415/211.2 |
| 3,778,194 A | * | 12/1973 | Miller | F01D 25/186 415/175 |
| 4,100,742 A | | 7/1978 | Harp, Jr. | |
| 4,155,684 A | * | 5/1979 | Curiel et al. | 417/409 |
| 4,548,040 A | * | 10/1985 | Miller | F02B 77/04 60/619 |

(Continued)

FOREIGN PATENT DOCUMENTS

| DE | 102005049138 A1 * | 4/2007 | ............. F02B 37/18 |
| EP | 2058484 A1 * | 5/2009 | ............. F02B 37/00 |

OTHER PUBLICATIONS

Wade, Robert Andrew et al., "Pulse Separated Direct Inlet Axial Automotive Turbine," U.S. Appl. No. 13/935,271, filed Jul. 3, 2013, 34 pages.

*Primary Examiner* — Mary A Davis
(74) *Attorney, Agent, or Firm* — Julia Voutyras; John D. Russell; B. Anna McCoy

(57) ABSTRACT

Systems and methods for operating a turbocharged engine are described. In one example, a turbocharger system, comprising: a bearing housing including a turbine and at least one compressor coupled to the turbine via a shaft; and wherein the turbine comprises a stator stage and a rotor stage mounted to the cylinder head by the bearing housing and positioned in an exhaust passage of a cylinder head. In this way, a more compact design is achieved which eliminates the cost and complexity of a turbine housing and improves turbine efficiency by positioning the turbine closer to the exhaust pulses.

16 Claims, 6 Drawing Sheets

(56) References Cited

U.S. PATENT DOCUMENTS

| | | |
|---|---|---|
| 4,610,235 A | 9/1986 | Grunig |
| 6,256,990 B1 | 7/2001 | Itoh |
| 8,262,341 B2 * | 9/2012 | Hilakari .................. F01D 9/041 415/115 |
| 2007/0130943 A1 * | 6/2007 | Sausse et al. .................... 60/602 |
| 2009/0123321 A1 | 5/2009 | Shin |
| 2010/0175374 A1 | 7/2010 | Steiner et al. |
| 2010/0180592 A1 * | 7/2010 | Williams et al. ............... 60/602 |
| 2010/0296920 A1 | 11/2010 | Koch |
| 2011/0132296 A1 | 6/2011 | Kuhlbach |
| 2011/0173972 A1 | 7/2011 | Wade et al. |
| 2011/0211986 A1 | 9/2011 | Arai |
| 2012/0037101 A1 | 2/2012 | Riegger et al. |
| 2012/0055425 A1 | 3/2012 | Mueller |
| 2012/0067306 A1 | 3/2012 | Mehring et al. |
| 2012/0174580 A1 | 7/2012 | Kuhlbach et al. |
| 2012/0180476 A1 | 7/2012 | Steiner et al. |
| 2012/0234002 A1 * | 9/2012 | Lombard et al. ............... 60/602 |
| 2016/0115802 A1 * | 4/2016 | Grissom ............... F02B 37/183 60/602 |

\* cited by examiner

DIRECT INLET AXIAL AUTOMOTIVE TURBINE

BACKGROUND AND SUMMARY

Turbocharging an internal combustion engine can both reduce external emissions and increase the specific power output of the engine, as exhaust from the engine cylinders may be directed through a turbine and the resulting energy used to power a compressor. One example configuration integrates the exhaust ports leading from the engine cylinders and the turbine housing into the cylinder head itself.

Conventional turbocharging of an internal combustion engine includes a cylinder head which directs exhaust gasses into an exhaust manifold, which in turn directs the exhaust gasses into a turbine housing and through a turbine. The work extracted from the turbine is used to drive a compressor which increases the density of air available to power the piston portion of the engine. The turbine stage is typically a single stage radial unit with a wastegate passage in a gasoline engine.

Some modern engines utilize a concept where the exhaust ports from a plurality of cylinders are directed to a single outlet in the cylinder head. This gas is then directed through a turbine housing into the turbocharger. The exhaust manifold and turbocharger are typically constructed out of materials which are durable when exposed to repeated high temperature cycles stemming from the high temperature of exhaust gas exiting the cylinders. Such materials have a very high cost. The inventors herein have recognized that some of the cost could be reduced by removing the turbine housing and moving the turbine into the cylinder head. The cylinder head has a cooling jacket, mitigating the need for the expensive high-temperature resistant material.

A cylinder head with integral exhaust ducting and turbocharger housing is disclosed in US 2011/0173972. In this prior art example, much of the collector geometry was integrated into the cylinder head. However, this approach may be problematic, in that a large amount of aluminum cylinder head material must be cooled via engine coolant flow. This could cause an increase in heat rejected to the radiator and possibly limit vehicle performance during extreme maneuvers on hot days.

Various exemplary systems and methods are disclosed herein to at least partially address the problems described above. In one example, a turbocharger system, comprising: a bearing housing including a turbine; at least one compressor coupled to the turbine via a common shaft; and wherein the turbine comprises a stator stage and a rotor stage mounted to the cylinder head by the bearing housing and positioned in an exhaust passage of the cylinder head. The system may further comprise an axial turbine that receives exhaust gas still contained within the cylinder head. In this way, the turbocharger size may decrease, and the exhaust pulses are preserved to power the turbine.

Further, the bearing housing may further comprise a hot gas collector, and the bearing housing and hot gas collector may be one piece. In this way, the exhaust gas that passes through the turbine is cooled substantially as the energy is extracted via the turbine. The resulting lower temperature exhaust gas enables the use of lower cost materials in the bearing housing and collector, such as cast iron.

In another example, a system for an engine, comprising: a cylinder head that includes one or more exhaust passages contained within the cylinder head; a turbocharger comprising: one or more turbines including a rotor stage, one or more compressor stages and one or more shafts coupling the turbine to the compressor; and wherein the one or more exhaust passages include a first and second outlet, the rotor stage being coupled to the first outlet such that exhaust gas flowing through the first outlet causes the turbine to rotate about the shaft and further drive the compressor, the second outlet bypassing the rotor stage coupled to the first outlet, and the turbine housing is formed by the cylinder head. In this way, the system reduces the amount of cylinder head material exposed to hot gasses. The hot gas collector may be moved off the cylinder head and into a casting shared with the bearing housing. This configuration will reduce the heat rejected to the radiator to be comparable to that of an integrated exhaust manifold configuration already commonly used in turbocharged engines.

Further, the system may comprise a stator stage which may be a fabricated sheet stainless steel wheel welded into shape, or may be a cast stator. In other embodiments, the system may not comprise a stator stage, but the cylinder head may be configured to steer and accelerate the flow of exhaust gas to a desired incidence angle and velocity. In this way, the stator stage or cylinder head configuration may increase the efficiency of an axial turbine compared to prior art examples, and further the integration of a turbine into a cylinder head.

In another example, an engine cooling method comprising, within a cylinder head, combining exhaust flows from a plurality of cylinders, directing the combined exhaust flow from the cylinder head to a turbine located within a bearing housing, and directing the combined exhaust flow from the turbine to a hot gas collector within the bearing housing. In this way, the footprint of the turbocharger can be reduced, as well as reducing the need for a liquid cooling system for the turbine housing, although such cooling may be provided to some extent.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any of the disadvantages noted above or in any part of this disclosure.

BRIEF DESCRIPTION OF FIGURES

FIGS. 2 and 3 are drawn approximately to scale, but other dimensions may be used.

DETAILED SPECIFICATION

Figure 1:
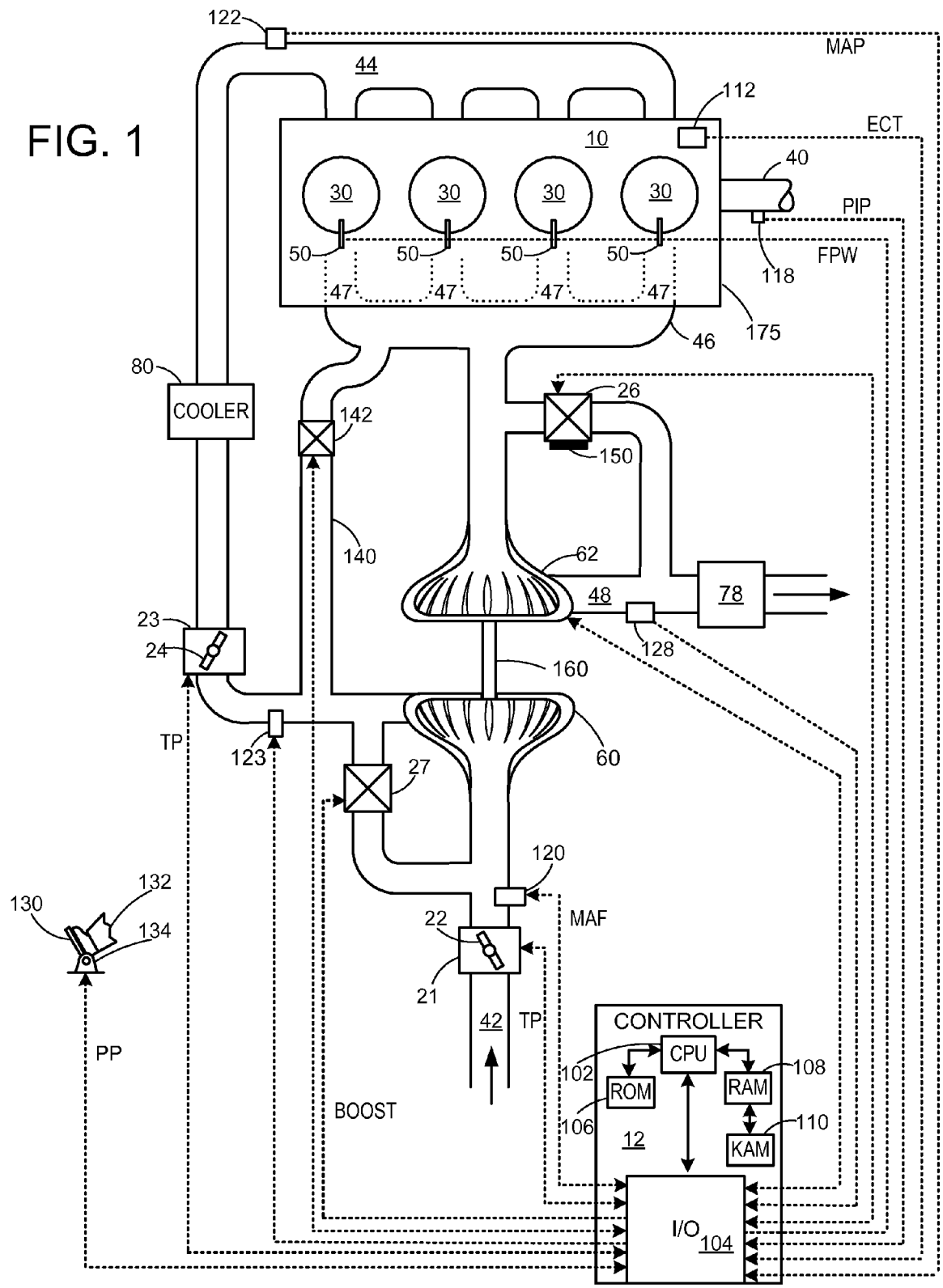
FIG. 1 shows a schematic diagram of a turbocharged engine in accordance with the present disclosure.

The following description relates to systems and methods for operating an engine including a turbocharger system, for example as shown in FIG. 1.

FIG. 1 is a schematic diagram showing an example engine 10, which may be included in a propulsion system of an automobile. The engine 10 includes cylinder head 175, which is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Cylinders 30 may be coupled to exhaust passage 48 through a plurality of valves and ports described further below and in reference to FIG. 3. The plurality of valves may open to allow exhaust to exit cylinders 30 and enter exhaust ports 47, which further direct exhaust gas to exhaust passage 48. In the example depicted in FIG. 1, the exhaust ports 47 are located inside of cylinder head 175. It will be appreciated that such a conformation may be referred to as an "integrated exhaust manifold" wherein exhaust manifold 46 is located inside cylinder head 175.

Exhaust gas sensor 128 is shown coupled to exhaust passage 48 upstream of emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof. Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged upstream of intake manifold 44. For a turbocharger, compressor 60 may be at least partially driven by a turbine 62, via, for example shaft 160, or other coupling arrangement. The turbine 62 may couple exhaust manifold 46 to exhaust passage 48, for example via an integrated exhaust manifold, as described above. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator, to provide power to a battery via a turbo driver. Power from the battery may then be used to drive the compressor 60 via a motor. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator including permanent magnets. In various embodiments, actuator 150 may be an electric motor, a pressure controlled actuator or a vacuum controlled actuator. Additional detail regarding wastegate 26 and actuator 150 will be presented below. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

An exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 2:
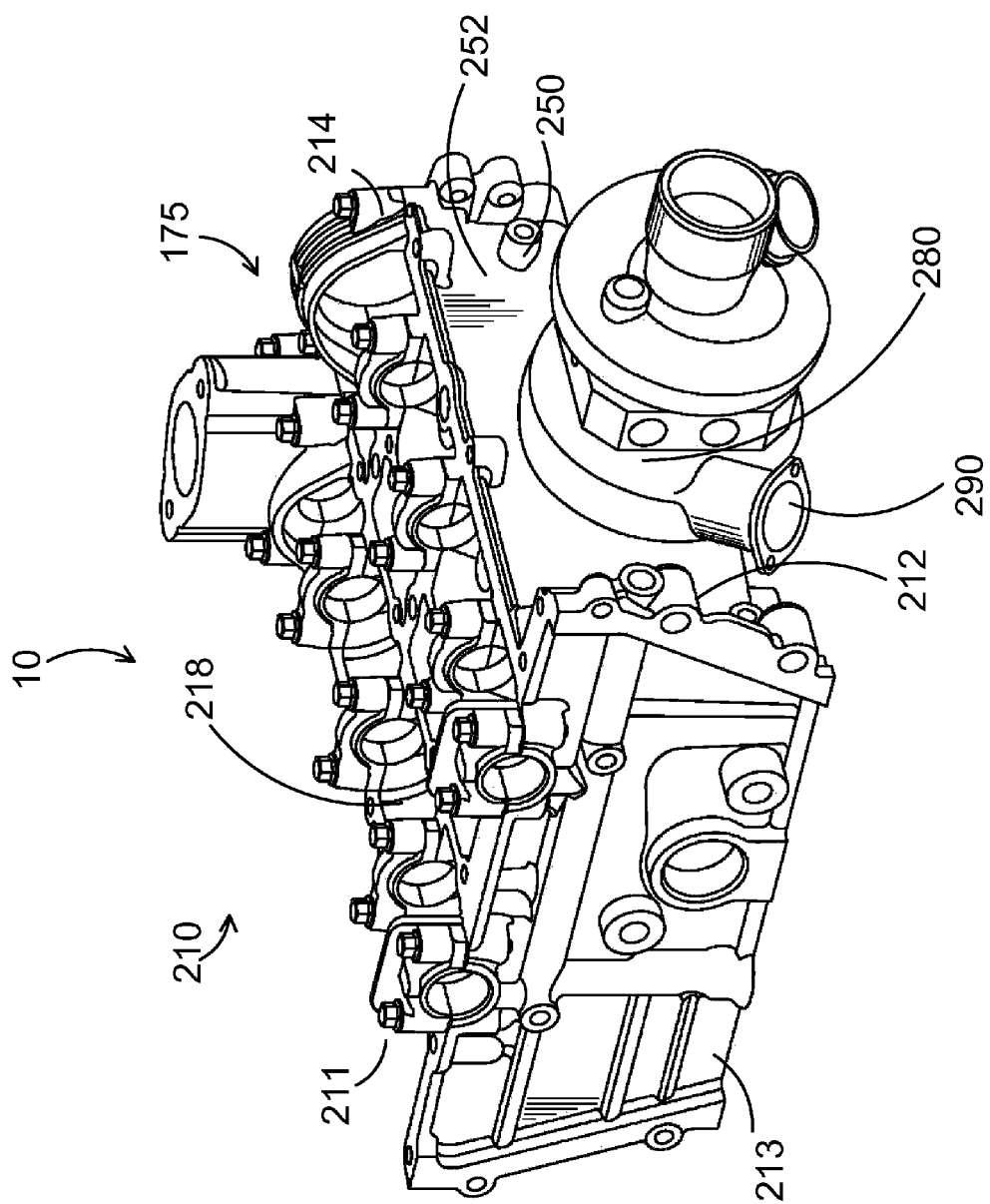
FIG. 2 shows a perspective view of a cylinder head coupled to a bearing housing.

FIG. 2 shows a perspective view of a cylinder assembly 210 in accordance with the present disclosure. Cylinder assembly 210 includes cylinder head 175 which may attach to a cylinder block (not shown) which includes a plurality of combustion chambers (e.g., cylinder) 30 of engine 10 that may each include combustion chamber walls with a piston (not shown) positioned therein. The cylinders may be positioned in an inline configuration such that the cylinders are aligned along the central axis of the cylinder head. Alternatively, the cylinders may be aligned in a V-configuration, a flat configuration or other suitable configuration. When attached to a cylinder block, the depicted cylinder head 175 may form 4 cylinders. In another example, the cylinder assembly may utilize an alternate number of cylinders, such as 3 cylinders. Cylinder head 175 may be cast out of a suitable material such as iron or aluminum. The cylinder head may include numerous components not depicted in this example perspective, including camshafts, intake and exhaust valves, spark plugs, fuel injectors 50, temperature sensor 112, other suitable mechanical components and other suitable sensors and actuators, such as shown in FIG. 1, for example.

As depicted, cylinder head 175 includes four perimeter walls. The walls include a first side wall 211, a second side wall 212, a rear end wall 213, and a front end wall 214. First sidewall 211 may be configured as the intake side of the cylinder head cooperating with intake valves of the engine, and may include components such as valves and ports as needed to interface with intake manifold 44 and to allow or restrict the flow of intake air into the cylinder head. Front end wall 214 may include components as needed to interface with crankshaft 40 and to allow the coupling of crankshaft 40 to the pistons included in cylinder head 175. Second sidewall 212 may be configured as the exhaust side of the cylinder head cooperating with exhaust valves of the engine and may include components such as one or more mounting bolt boss 252 or other suitable devices for mounting bearing housing 280 directly to the cylinder head. In this example configuration, the turbocharger assembly may be directly coupled to the cylinder head. Alternatively, the turbocharger assembly may be indirectly coupled to the cylinder head. The turbocharger assembly and possible configurations thereof are discussed further below and with regard to FIG. 3. Cylinder head 175 may also include a plurality of cylinder closure portions 218.

Cylinder head 175 may include one or more cooling jackets. For example, a first cooling jacket may be located between exhaust manifold 46 and the interface between cylinder head 175 and the cylinder block. A second cooling jacket may be located on the opposite side of the exhaust manifold as the first cooling jacket. The first and second cooling jackets may be coupled together by a flow passage. In some examples, the first and second cooling jackets may be coupled to a turbine cooling jacket through a flow passage. In another example, the first and second cooling jackets may be separate and operate with different coolants or different supplies of the same coolant. In another example, a first cooling jacket may be located on the intake side of the plurality of cylinders, and a second cooling jacket located on the exhaust side of the cylinders. The two cooling jackets may have substantially different cooling capacities, and may be coupled to a cooling water system including a radiator, coolant pump driven by the engine, thermostat, etc. In one example, a cooling jacket located on the exhaust side of the cylinders may have a higher cooling capacity than the cooling jacket on the intake side of the cylinders, for example via a higher flow rate, increased surface area, etc. In another example, the cooling jacket located on the intake side of the cylinders may have a higher cooling capacity than the cooling jacket on the exhaust side of the cylinders.

Cylinder head 175 includes an exhaust manifold 46. The components of the exhaust manifold will be discussed further below and with regard to FIG. 3, and include a plurality of exhaust ports 47 coupled to cylinders 30, and a plurality of exhaust runners 310 coupled to exhaust ports 47. Exhaust runners 310 may discharge exhaust gas into exhaust collector 320. Each cylinder may have an intake and exhaust valve. In some cases, each cylinder may include two or more intake valves and two or more exhaust valves. Each intake valve and exhaust valve may be operated by an intake cam and an exhaust cam, respectively. In another example, the intake and exhaust valves may be actuated by a valve coil and armature assembly.

Figure 5:
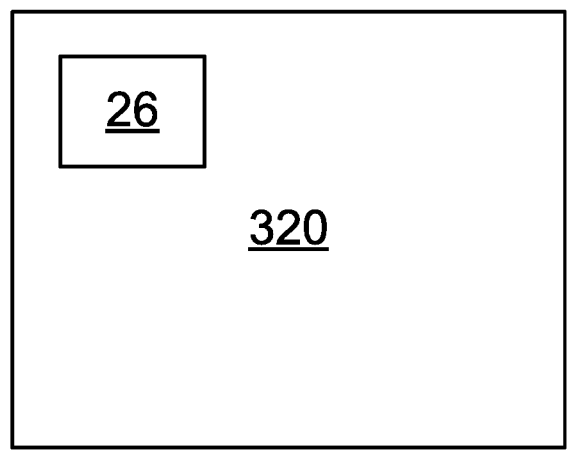
FIG. 5 shows a schematic diagram of one embodiment of an exhaust collector.

One or more of exhaust runners 310 may be further configured to include a wastegate 26 (not shown). Alternatively, wastegate 26 may be included in exhaust collector 320, as schematically shown in FIG. 5. Wastegate 26 may be configured to control the amount of exhaust gas that bypasses the turbine. Wastegate 26 may be actuated by wastegate actuator 150. Wastegate actuator 150 may be mounted onto cylinder head 175 or onto bearing housing 280. The wastegate may be actuated in response to the pressure in exhaust collector 275 exceeding a threshold as measured by a pressure sensor (nor shown) or in response to MAP sensor measurements above the required value to deliver the desired torque. Wastegate actuator 150 may be activated or deactivated in response to signals sent by controller 12. Activation of wastegate 26 allows exhaust gas to enter exhaust outlet 290 and further to an exhaust bypass line (not shown), allowing the exhaust gas to bypass the turbocharger assembly. Exhaust outlet 290 may be included in bearing housing 280. The wastegate passage may have an entry coupled to the cylinder head and an exit coupled to a hot gas collector within the bearing housing.

Figure 3:
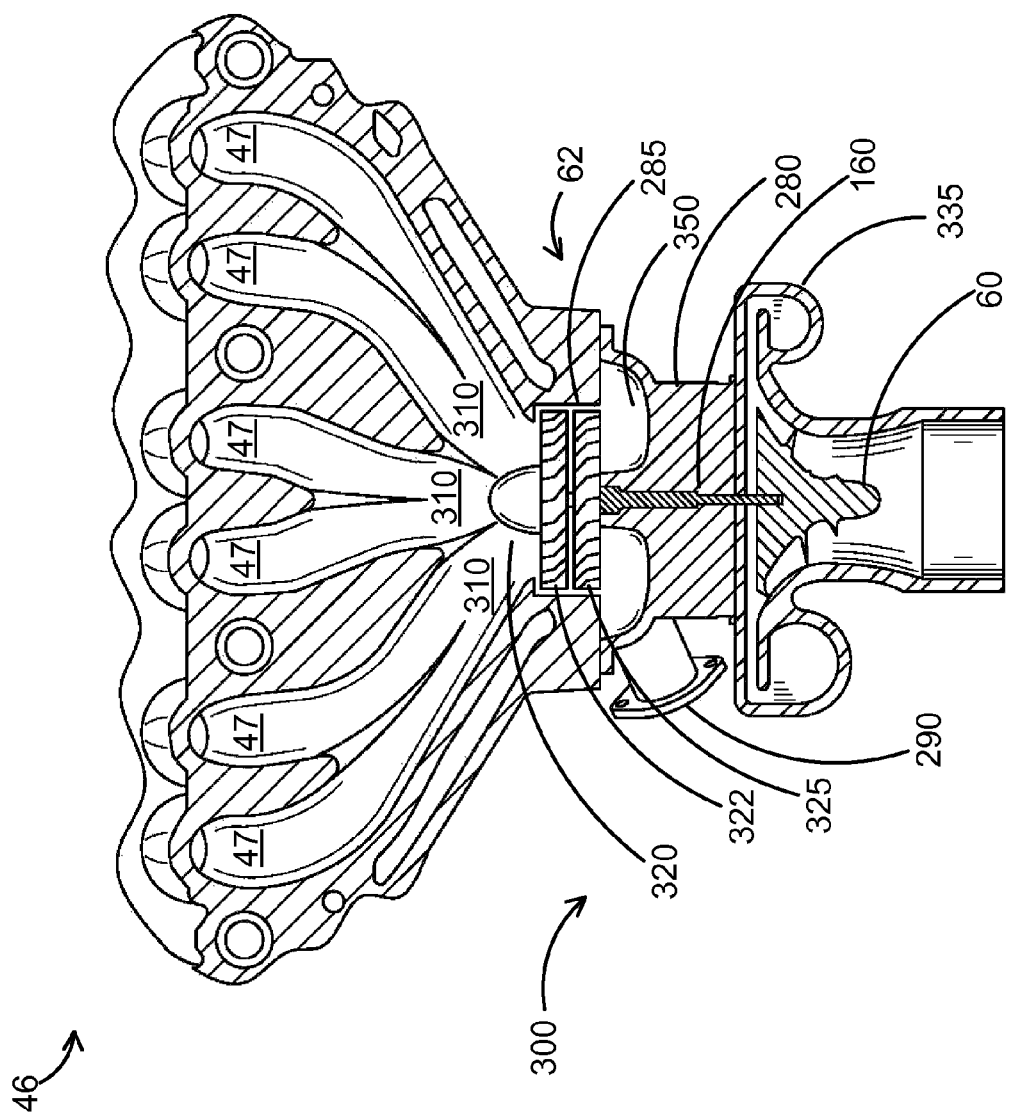
FIG. 3 shows a perspective view of an exhaust manifold and turbocharger assembly.

Bearing housing 280 may be attached to cylinder head 175 via mounting bolts 250 and mounting bolt boss 252, or through other appropriate attachment devices. As depicted in FIGS. 2 and 3, the direct coupling of bearing housing 280 to cylinder head 175 in this configuration allows for turbine 62 to be situated proximal to exhaust collector 320, allowing for conservation of exhaust gas energy within engine 10. As discussed further below and in regards to FIG. 3, this example configuration may allow for some of the components of the turbocharger assembly, such as the rotor stage and stator stage to be directly coupled to the cylinder head, minimizing the amount of space taken up by the turbocharger assembly. Bearing housing 280 may include other components as needed for mounting components of the turbocharger assembly or components as needed to mount additional sensors or actuators. For example a mounting boss for an exhaust gas oxygen sensor may be included in bearing housing 280.

Figure 4:
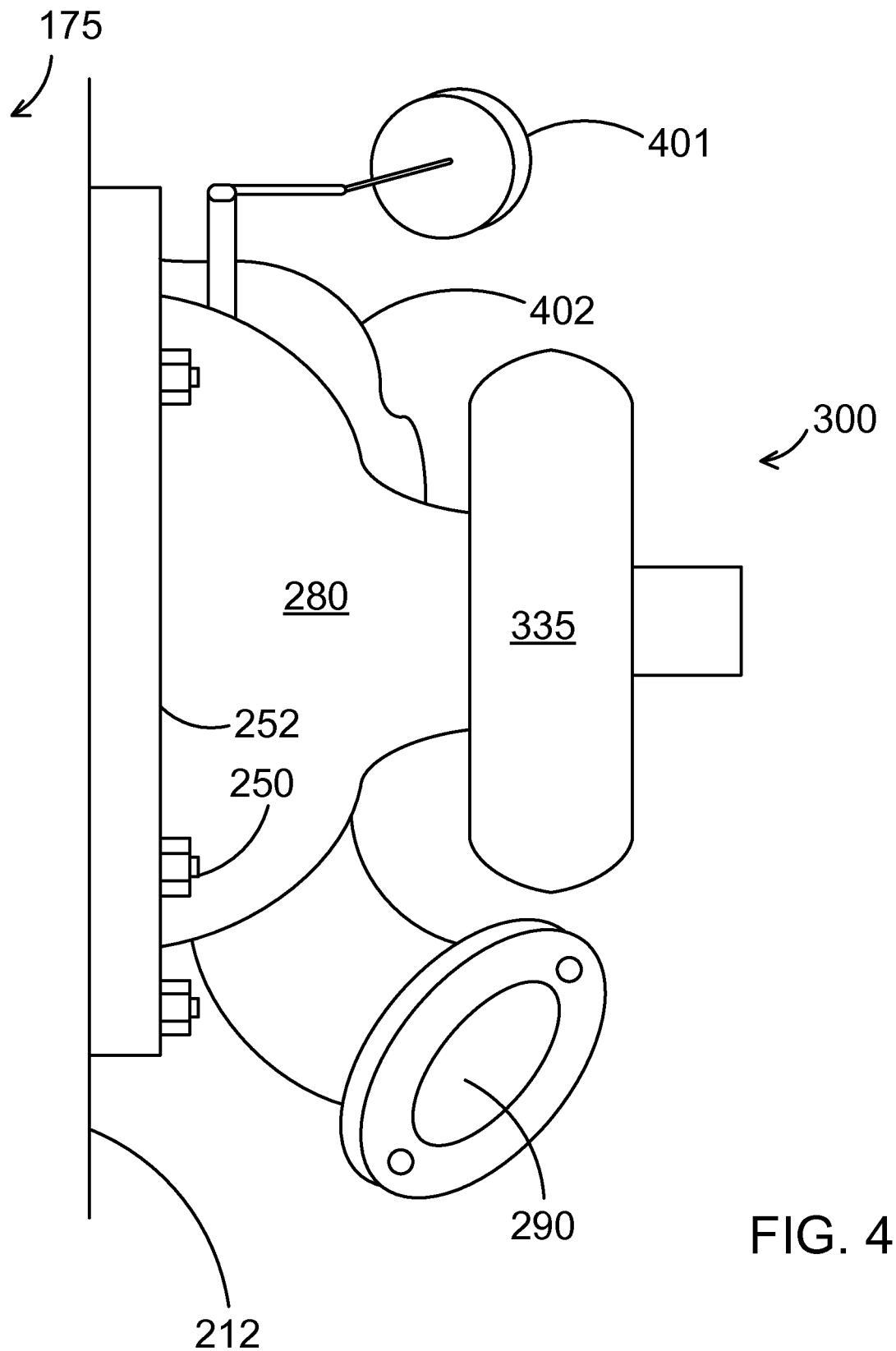
FIG. 4 shows a perspective view of a turbocharger assembly equipped with an oil and coolant supply.

FIGS. 3 and 4 show perspective views of the turbocharger assembly in accordance with the current disclosure. FIG. 3 shows a perspective view of exhaust ports 47, exhaust runners 310 and turbocharger assembly 300 in accordance with the current disclosure. FIG. 3 shows an example exhaust manifold 46 for a 3 cylinder engine, but may also include fewer cylinders or additional cylinders, for example 2, 4, 5 or 6 cylinders. FIG. 4 shows a side view of the turbocharger assembly in accordance with the present disclosure. Exhaust manifold 46 may be included in cylinder head 175 as depicted in FIG. 2. Each cylinder 30 may have one or more exhaust valves coupled between the cylinder and an exhaust port 47. Exhaust ports 47 may be coupled to exhaust runners 310. The exhaust ports receive exhaust gas released from the cylinders during engine operation. An exhaust runner may be formed at the merger of exhaust ports from adjacent cylinders or from cylinders that are not adjacent.

One or more exhaust runners may also include a wastegate passage 26 as described above. Under a condition where exhaust pressure in exhaust collector 320 exceeds a predetermined threshold, controller 12 may activate wastegate actuator 150, allowing exhaust gas to flow through wastegate 26 and into exhaust outlet 290, where it may be routed through an exhaust bypass line, bypassing the turbocharger assembly.

In another example, one or more exhaust runners 310 may direct exhaust gas back to intake manifold 44 for re-entry to engine 10 as part of a dedicated exhaust gas recirculation system. In yet another example, a valve or other switching mechanism may divert exhaust gas flow from one or more exhaust runners 310 to intake manifold 44 under a first condition, and to exhaust gas collector 320 under a second condition.

Exhaust gas collector 320 may be included in bearing housing 280. In another example, the exhaust gas collector may be included in cylinder head 175. In yet another example, the exhaust gas collector may be a separate component coupled between the cylinder head and bearing housing, or may be composed of portions of both the cylinder head and bearing housing. Exhaust gas may be directed from exhaust gas collector 320 to turbocharger assembly 300.

Turbocharger assembly 300 may include bearing housing 280, turbine housing 285, turbine 62, compressor housing 335, compressor 60, as well as components thereof, some of which are discussed further below and in regard to FIG. 4. Exhaust gas collector 320 may be fabricated as a part of bearing housing 280 or may be fabricated separately. In the example system depicted in FIGS. 3 and 4, turbine 62 is an axial turbine, but may also be a radial turbine or a mixed flow turbine. The turbine may be of a single stage or of multiple stages. The stator may also be of single or multiple stages. For an axial turbine, the flow of exhaust gas approaching the turbine rotor blades may be described as running substantially axially. Herein, "substantially axially" is used to mean that the flow of exhaust gas through the turbine is parallel to the turbine shaft. The exhaust inlet may be configured to direct exhaust gas in a substantially axial direction to the turbine. In another example, turbine 62 may be configured to be a radial turbine, where the flow of exhaust gas approaching the turbine rotor blades runs substantially radially, and where the exhaust inlet is configured to direct exhaust gas in a direction substantially perpendicular to the turbine shaft. In another example, the exhaust gas may approach the turbine in a geometry between axial and radial, e.g. a mixed flow turbine.

Turbine housing 280 may be fabricated from cast iron or other suitable materials that have a high thermal distortion resistance, or other materials suitable for exposure to the high temperatures experienced during engine operation. Turbine stator 322 may be fabricated by welding sheets of stamped metal into appropriate shapes and configurations or may be made as a casting. Turbine collector 350 may be fabricated as a part of bearing housing 280, which may also be fabricated from cast iron or other suitable materials that have a high temperature capability. In this example, a further liquid cooling system may or may not be included.

Turbine housing 285 may also be fabricated from materials such as aluminum, and may thus further include a liquid cooling system be included in or surrounding the housing. As shown in FIG. 4, oil and coolant supply 401 may be supplied to bearing housing 280 through passages 402 integrated into the collector and bearing housing. Cooling may also be supplied with external coolant tubes and hoses. In another example, turbine housing 285 may be fabricated as a separate piece from bearing housing 280 and coupled the bearing housing with bolts or other suitable fasteners.

Turbocharger assembly 300 includes stator 322, rotor 325, turbine 62, compressor 60, compressor housing 335 and bearing housing 280. Turbine 62 may be coupled to compressor 60 via one or more shafts 160. Stator 322 may be placed within cylinder head 175. In one example, stator 322 may be fabricated from welded pieces of stainless steel sheet metal. Stator 322 may be cast as a separate piece or cast of multiple pieces. Stator 322 may be attached with various schemes, including snap-in-place, press-in-place, or mechanically attached with bolts or v-bands. The stator may be designed to fit into a complimentary stator mount within the cylinder head that both retains the stator and prevents its rotation. In some examples, the cylinder head may be configured to act as the stator, and configured to steer and accelerate the flow of exhaust gas to a desired incidence angle and velocity.

Rotor 325 may also be placed within cylinder head 175. In one example, the rotor may be mounted via one or more dowels. The bearing housing may have a cooling passage or passages routed near the dowel mounts in order to minimize thermal distortion of the bearing housing and to ensure the rotor remains in place and maintains sufficient distance between the rotor blades and the housing so as not to incur blade rubbing and to maintain a minimum clearance necessary to preserve turbine efficiency.

Turbocharger assembly 300 may also include a gas collector 350 following the turbine. Gas collector 350 may include a torroidial passage, wherein exhaust gas may be routed from the turbine to a single outlet part 290 of bearing housing 280. Gas collector 350 may further merge with exhaust outlet 290, or may direct exhaust gas to an emissions control device or an exhaust gas recirculation system.

The bearing housing may include a plurality of bearings that may be designed for both a thrust and a radial load. The bearings may include journal bearing, ball bearings, needle bearings, air bearings, or other such appropriate bearings. The turbine housing may be routed to include an oil and coolant supply, fed by a supply line 420.

Compressor 60 includes compressor housing 335, a compressor collector, an impeller, and an air inlet (not shown). The compressor impeller may be coupled to turbine 62 via shaft 160. The flow of exhaust gas though turbine 62 may drive rotational movement of drive shaft 160, which in turn drives the impeller to rotate. The air inlet delivers air to compressor 60, which is then compressed by compressor 60. Compressed air is then delivered back to intake manifold 44 through a series of conduits as described above and depicted schematically in FIG. 1.

Turbocharger assembly 300 is depicted as having a single turbine and a single turbine scroll. In another example, turbocharger assembly 300 may include more than one turbine and more than one scroll, for example a dual-scroll turbine. Turbocharger assembly 300 is depicted as having a single compressor, but may include more than one compressor. In an example system with more than one turbine, the turbines may have concentric shafts that drive a single compressor or multiple compressors. In another example, a supercharger may also be included in the vehicle system.

The systems depicted in FIGS. 1-4 may enable one or more systems. For example, a turbocharger system, comprising: a bearing housing including a turbine; at least one compressor coupled to the turbine via a shaft; and wherein the turbine comprises a stator stage and a rotor stage mounted to the cylinder head by the bearing housing and positioned in an exhaust passage of a cylinder head. The turbine may be an axial, radial or mixed flow turbine. The bearing housing may further comprise a hot gas collector. The bearing housing and hot gas collector may be one piece, and the piece comprising the bearing housing and hot gas collector may further comprises passages for oil and coolant. The cylinder head may further comprise a wastegate passage that may be actuated by an actuator coupled to the turbocharger or to the cylinder head. The bearing housing may be made of a cast material such as cast iron or a fabricator assembly. The rotor stage may use one or more dowels for position alignment and clearance of wheel tips of the turbine.

In another example, A system for an engine, comprising: a cylinder head that includes one or more exhaust passages contained within the cylinder head; a turbocharger comprising: one or more turbines including a rotor stage, a compressor and a shaft coupling the turbine to the compressor; and wherein the one or more exhaust passages include a first and second outlet, the rotor stage being coupled to the first outlet such that exhaust gas flowing through the first outlet causes the turbine to rotate about the shaft and further drive the compressor, the second outlet bypassing the rotor stage coupled to the first outlet, and where the turbine housing is formed by the cylinder head. The turbocharger may not comprise a stator stage, and the cylinder head may be configured to steer and accelerate the flow of exhaust gas to a desired incidence angle and velocity. The turbocharger may further comprise a stator stage. The stator stage may be a fabricated sheet stainless steel wheel welded into shape or a cast stator, and may include routing for water cooling, and may include an attachment feature, and the attachment feature may be one of snap-into-place, press-into-place, a system of screws, or a system of v-band clamps. The cylinder head may cover inline cylinders of the engine. The one or more turbines may be axial, radial or mixed flow turbines. A turbocharger bearing may be fixed within the cylinder head, and the cylinder head may comprise coolant passages adjacent the turbine.

Figure 6:
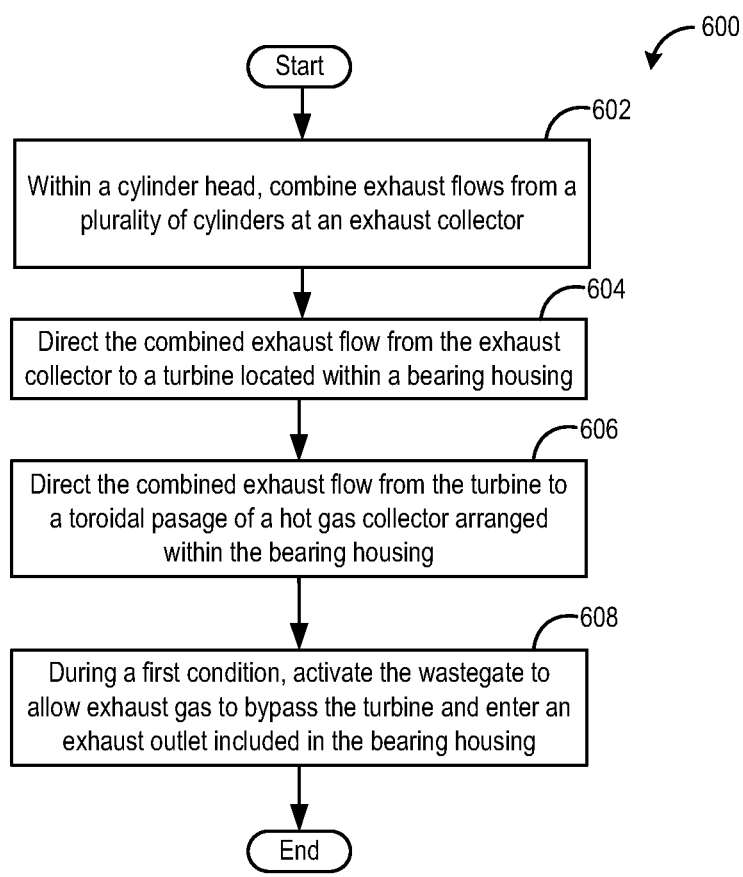
FIG. 6 shows a flowchart of an engine cooling method in accordance with the present disclosure.

The systems depicted in FIGS. 1-4 may also enable one or more methods, such as engine cooling method 600 shown in FIG. 6. At 602, method 600 includes, within a cylinder head, combining exhaust flows from a plurality of cylinders at an exhaust collector. After 602, method 600 proceeds to 604 to direct the combined exhaust flow from the exhaust collector to a turbine located within a bearing housing. After 604, method 600 proceeds to 606 to direct the combined exhaust flow from the turbine to a toroidal passage of a hot gas collector arranged within the bearing housing. After 606, method 600 proceeds to 608. At 608, the method includes, during a first condition, activating the wastegate to allow exhaust gas to bypass the turbine and enter an exhaust outlet included in the bearing housing. After 608, the method ends. An engine cooling method in accordance with the present disclosure may further comprise: during a first condition, directing a portion of the combined exhaust flow through a wastegate passage that has an entry coupled to the cylinder head and an exit coupled to the hot gas collector within the bearing housing.

It will be appreciated that the configurations and routines disclosed herein are exemplary in nature, and that these specific embodiments are not to be considered in a limiting sense, because numerous variations are possible. For example, the above technology can be applied to V-6, I-2, I-3, I-4, I-6, V-12, opposed 2, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
   a cylinder head that includes a plurality of exhaust passages collecting exhaust gas in an exhaust collector contained within the cylinder head, the exhaust collector including a wastegate;
   a turbocharger comprising: one or more turbines including a rotor stage, one or more compressors, and one or more shafts coupling the one or more turbines to the one or more compressors;
   at least one of the one or more turbines and rotor stage located within the cylinder head; and
   a hot gas collector arranged within and fabricated as a part of a turbocharger bearing housing, the turbocharger bearing housing directly mounted to the cylinder head;
   wherein when the wastegate is activated, exhaust gas bypasses the one or more turbines and enters an exhaust outlet included in the turbocharger bearing housing.

2. The system of claim 1 where the cylinder head further comprises a wastegate passage having an entry coupled to the cylinder head and an exit coupled to the hot gas collector within the turbocharger bearing housing.

3. The system of claim 2 where the wastegate passage is actuated by an actuator coupled to the turbocharger or to the cylinder head.

4. The system of claim 1 where the turbocharger bearing housing is made of a cast material such as cast iron or made of a fabricator assembly such as welding sheets of metal.

5. The system of claim 1, where the turbocharger further comprises a stator stage.

6. The system of claim 5, where the stator stage is a fabricated sheet stainless steel wheel welded into shape or a cast stator.

7. The system of claim 5, where the stator stage includes routing for water cooling.

8. The system of claim 5, where the stator stage includes an attachment feature, and the attachment feature is one of snap-into-place, press-into-place, a system of screws, or a system of v-band clamps.

9. The system of claim 1, wherein the cylinder head covers inline cylinders of the engine.

10. The system of claim 1, wherein the one or more turbines are axial, radial or mixed flow turbines.

11. The system of claim 1, further comprising coolant passages in the cylinder head adjacent the one or more turbines.

12. The system of claim 1, wherein the hot gas collector includes a toroidal passage.

13. The system of claim 1, further comprising a plurality of exhaust runners which discharge exhaust gas into the exhaust collector, wherein each exhaust runner is formed at a merger of exhaust ports from adjacent cylinders of a plurality of cylinders or from cylinders of the plurality of cylinders that are not adjacent.

14. An engine method, comprising:
    within a cylinder head, combining exhaust flows from a plurality of cylinders at an exhaust collector, the exhaust collector including a wastegate;
    directing the combined exhaust flow from the exhaust collector to a turbine located within the cylinder head;
    directing the combined exhaust flow from the turbine to a toroidal passage of a hot gas collector arranged within a bearing housing; and
    during a first condition, activating the wastegate to allow exhaust gas to bypass the turbine and enter an exhaust outlet included in the bearing housing.

15. The engine method of claim 14, wherein the hot gas collector is fabricated as a part of the bearing housing such that the bearing housing and hot gas collector are one piece.

16. The engine method of claim 14, further comprising discharging exhaust gas from a plurality of exhaust runners into the exhaust collector, wherein each exhaust runner is formed at a merger of exhaust ports from adjacent cylinders of the plurality of cylinders or from cylinders of the plurality of cylinders that are not adjacent.

* * * * *